United States Patent
Zealand et al.

(10) Patent No.: US 11,853,034 B2
(45) Date of Patent: Dec. 26, 2023

(54) EXOSUIT ACTIVITY TRANSITION CONTROL

(71) Applicant: X Development LLC, Mountain View, CA (US)

(72) Inventors: Kathryn Jane Zealand, Palo Alto, CA (US); Elliott J. Rouse, Ann Arbor, MI (US); Georgios Evangelopoulos, Venice, CA (US)

(73) Assignee: Skip Innovations, Inc., San Francisco, CA (US)

( * ) Notice: Subject to any disclaimer, the term of this patent is extended or adjusted under 35 U.S.C. 154(b) by 211 days.

(21) Appl. No.: 17/110,537

(22) Filed: Dec. 3, 2020

(65) Prior Publication Data

US 2021/0349445 A1 Nov. 11, 2021

(30) Foreign Application Priority Data

May 8, 2020 (GR) .............................. 20200100233

(51) Int. Cl.
| | | |
|---|---|---|
| G05B 19/4155 | (2006.01) | |
| B25J 9/00 | (2006.01) | |
| G06N 20/00 | (2019.01) | |
| H04Q 9/00 | (2006.01) | |

(52) U.S. Cl.
CPC ........ *G05B 19/4155* (2013.01); *B25J 9/0006* (2013.01); *G06N 20/00* (2019.01); *H04Q 9/00* (2013.01); *G05B 2219/40305* (2013.01)

(58) Field of Classification Search
None
See application file for complete search history.

(56) References Cited

U.S. PATENT DOCUMENTS

| | | |
|---|---|---|
| 6,725,124 B2 | 8/2004 | Yan |
| 6,907,310 B2 | 6/2005 | Gardber et al. |
| 7,678,147 B2 | 3/2010 | Clifford et al. |
| 8,384,714 B2 | 2/2013 | De Aguiar et al. |
| 8,838,263 B2 | 9/2014 | Sivak et al. |
| 8,994,776 B2 | 3/2015 | Sutherland et al. |

(Continued)

FOREIGN PATENT DOCUMENTS

| | | |
|---|---|---|
| KR | 20170077898 | 7/2017 |
| WO | WO 2017/044093 | 3/2017 |

OTHER PUBLICATIONS

All2dp.com [online], "2020 Best Free 3D Printing Software," Mar. 25, 2020, retrieved on May 14, 2020, retrieved from URL<https://all3dp.com/1/best-free-3d-printing-software-3d-printer-program/>, 43 pages.

(Continued)

*Primary Examiner* — Jason D Mitchell
(74) *Attorney, Agent, or Firm* — Mughal Gaudry & Franklin PC

(57) ABSTRACT

Methods, systems, and apparatus, including computer programs encoded on a computer storage medium, for an exosuit activity transition control structure. In some implementations, sensor data for a powered exosuit is received. The sensor data is classified depending on whether the sensor data is indicative of a transition between different types of activities of a wearer of the powered exosuit. The classification is provided to a control system for the powered exosuit. The powered exosuit is controlled based on the classification.

20 Claims, 4 Drawing Sheets

(56) References Cited

U.S. PATENT DOCUMENTS

| | | | |
|---|---|---|---|
| 9,162,142 B2 | 10/2015 | Shum et al. | |
| 9,235,765 B2 | 1/2016 | Bentley et al. | |
| 9,265,647 B2 | 2/2016 | DeSousa | |
| 9,457,589 B2 | 10/2016 | Miller et al. | |
| 9,460,557 B1 | 10/2016 | Tran et al. | |
| 9,562,742 B2 | 2/2017 | Popovici | |
| 9,665,906 B2 | 5/2017 | Adeyoola et al. | |
| 9,737,239 B2 | 8/2017 | Kimmel | |
| 9,788,600 B2 | 10/2017 | Wawrousek et al. | |
| 9,792,479 B2 | 10/2017 | Mallet et al. | |
| 9,895,841 B2 | 2/2018 | Page | |
| 9,928,633 B2 | 3/2018 | Cotter et al. | |
| 10,067,500 B2 | 9/2018 | Hargovan et al. | |
| 10,390,973 B2 | 8/2019 | Tong et al. | |
| 10,555,792 B2 | 2/2020 | Kopelman et al. | |
| 11,498,203 B2* | 11/2022 | Ding | B25J 9/0006 |
| 2003/0120183 A1 | 6/2003 | Simmons | |
| 2013/0237884 A1* | 9/2013 | Kazerooni | A61H 1/00 601/34 |
| 2014/0007016 A1 | 1/2014 | Li | |
| 2016/0107309 A1 | 4/2016 | Walsh et al. | |
| 2016/0088284 A1 | 5/2016 | Sareen et al. | |
| 2016/0128890 A1 | 5/2016 | LaChappelle et al. | |
| 2016/0158033 A1* | 6/2016 | Hahn | A61B 5/389 623/25 |
| 2016/0247017 A1 | 8/2016 | Sareen et al. | |
| 2016/0349738 A1 | 12/2016 | Sisk | |
| 2017/0151081 A1* | 6/2017 | Feris | A61F 5/0102 |
| 2017/0202724 A1 | 7/2017 | Rossi et al. | |
| 2017/0231794 A1 | 8/2017 | Church | |
| 2017/0287212 A1 | 10/2017 | Tran et al. | |
| 2018/0243155 A1 | 8/2018 | Angold et al. | |
| 2019/0029914 A1* | 1/2019 | Polygerinos | A63B 23/0494 |
| 2019/0035149 A1 | 1/2019 | Chen et al. | |
| 2019/0105777 A1* | 4/2019 | Dalley | B25J 9/1615 |
| 2019/0299522 A1 | 10/2019 | Chapiro et al. | |
| 2019/0307583 A1* | 10/2019 | Herr | A61H 3/00 |
| 2019/0328604 A1 | 10/2019 | Contreras-Vidal et al. | |
| 2019/0350794 A1* | 11/2019 | Angold | A61H 1/0277 |
| 2019/0374161 A1* | 12/2019 | Ly | A61F 2/68 |
| 2019/0380904 A1 | 12/2019 | Panizzolo et al. | |
| 2020/0008745 A1* | 1/2020 | Burch, V | G16H 50/30 |
| 2020/0016020 A1* | 1/2020 | Mooney | A61B 5/1071 |
| 2020/0060921 A1* | 2/2020 | Dalley | B25J 9/0006 |
| 2020/0082138 A1 | 3/2020 | Newman | |
| 2020/0223071 A1* | 7/2020 | Mahoney | A63B 21/00181 |
| 2020/0323726 A1* | 10/2020 | Dalley | A61H 3/00 |
| 2020/0372245 A1* | 11/2020 | Juhas | A61B 5/1118 |
| 2021/0053208 A1* | 2/2021 | Paine | A61H 1/0244 |
| 2021/0170572 A1* | 6/2021 | Chen | B25J 9/0006 |
| 2021/0346179 A1* | 11/2021 | Langlois | A61F 2/60 |
| 2022/0143808 A1* | 5/2022 | Yu | A61H 3/00 |
| 2022/0211566 A1* | 7/2022 | Yeow | A61H 1/0281 |
| 2022/0270297 A1* | 8/2022 | Koh | G01B 11/24 |
| 2022/0347038 A1* | 11/2022 | Geffard | B25J 9/0006 |

OTHER PUBLICATIONS

All2dp.com [online], "3D Printed Cloths: Myth or Reality?," Jun. 27, 2019, retrieved on May 14, 2020, retrieved from URL<https://all3dp.com/2/3d-printed-cloths-myth-or-reality/, 10 pages.

Ashley, "Robotic Exoskeletons Are Changing Lives in Surprising Ways," Feb. 21, 2017, retrieved on Mar. 31, 2020, retrieved from URL <https://www.nbcnews.com/mach/innovation/robotic-exoskeletons-are-changing-lives-surprising-ways-n722676>, 4 pages.

avanti.care [online], "Powered clothing & exo-skeletons: Technology in care," May 15, 2019, retrieved from URL <https://avanti.care/powered-clothing-exo-skeletons/>, 4 pages.

biodesign.seas.harvard.edu [online], "Soft Exosuits," Jan. 27, 2017, retrieved on Mar. 31, 2020, retrieved from URL <https://biodesign.seas.harvard.edu/soft-exosuits>, 3 pages.

Cyberdyne.jp [online] "HAL For Living Support Single Joint Type," 2020, retrieved on Oct. 26, 2020, retrieved from URL <https://www.cyberdyne.jp/english/products/SingleJoint.html>, 6 pages.

Dormehl, "This sleek new exoskeleton makes walking easier, fits under your clothes," Mar. 25, 2019, retrieved from URL <https://www.digitaltrends.com/cool-tech/vanderbilt-ankle-exoskeleton/>, 6 pages.

Dorrier, "Robotic Exoskeletons, Like This One, Are Getting More Practical," Dec. 18, 2019, retrieved on Mar. 31, 2020, retrieved from URL <https://singularityhub.com/2019/12/18/robotic-exoskeletons-like-this-one-are-getting-more-practical/>, 2 pages.

Dummies.com [online], "How to Scan Objects for 3D Printing," retrieved on May 14, 2020, retrieved from URL<https://www.dummies.com/computers/pcs/printers/how-to-design-in-the-computer-for-3d- printing//>, 16 pages.

Exoskeletonreport.com [online], "Seismic Powered Clothing—A Consumer Wellness Experience," Jan. 17, 2019, retrieved from URL <https://exoskeletonreport.com/2019/01/seismic-powered-clothing-a-consumer-wellness-experience/>, 4 pages.

fit3d.com [online], "Use your Body Scans to Buy Better Fitting Clothes," Nov. 9, 2018, retrieved on Mar. 31, 2020, retrieved from URL <https://fit3d.com/blog/personalized-clothing>, 2 pages.

Lacy, "Amazon Might Use 3D Body Scans to Customize Clothes—and Also Capture Your Data," Jul. 21, 2019, retrieved from URL <https://www.adweek.com/retail/amazon-might-use-3d-body-scans-to-customizeclothes-and-also-capture-your-data/>, 2 pages (Excerpt only).

Lee et al., "Biomechanical Design of a Novel Flexible Exoskeleton for Lower Extremities," IEEE/ASME Transactions on Mechatronics, Oct. 2017, 22(5):2058-2069.

Lee, "3D body scanner promises perfectly fitting clothes," Oct. 3, 2019, retrieved on Mar. 31, 2020, retrieved from URL <https://www.engadget.com/2019-10-03-virtual-try-on-scanatic-fashion.html>, 10 pages.

Marinov, "SRI Robotics Super Flex Exosuit," Apr. 13, 2016, retrieved on Mar. 31, 2020, retrieved from URL <https://exoskeletonreport.com/2016/04/sri-robotics-super-flex-exosuit/>, 4 pages.

Moon et al., "Development of a Single Leg Knee Exoskeleton and Sensing Knee Center of Rotation Change for Intention Detection," Sensors, 2019, 19(3960):19 pages.

Morby, "Yves Béhar's Aura Power Clothing helps the elderly with mobility," Jan. 12, 2017, retrieved from URL <https://www.dezeen.com/2017/01/12/yves-behar-aura-power-clothing-helps-elderly-mobility-design-museum-london/>, 16 pages.

myseismic.com [online], "A fusion of apparel and robotics," Sep. 8, 2018, retrieved from URL <https://www.myseismic.com/>, 9 pages.

Pardes, "The Perfect Pair of Pants Is Just a 3D Body Scan Away," Feb. 28, 2019, retrieved on Mar. 31, 2020, retrieved from URL <https://www.wired.com/story/bespoke-clothing-3d-body-scans/>, 5 pages.

Park et al., "A Soft Wearable Robotic Device for Active Knee Motions using Flat Pneumatic Artificial Muscles," 2014 IEEE International Conference on Robotics & Automation, May 31-Jun. 7, 2014, 6 pages.

rewalk.com [online], "About Products," Apr. 28, 2019, retrieved on Mar. 31, 2020, retrieved from URL <https://rewalk.com/about-products-2/>, 8 pages.

rewalk.com [online], "The ReStore Soft Exo-Suit," Dec. 20, 2019, retrieved from URL <https://rewalk.com/restore-exo-suit/>, 5 pages.

Sridar et al., "A Soft-Inflatable Exosuit for Knee Rehabilitation: Assisting Swing Phase During Walking," Frontiers in Robotics and AI, May 2018, 5(44):9 pages.

TechCrunch [online], "Electronic Apparel debuts a new line of powered clothing at Disrupt SF 2018," Sep. 17, 2018, retrieved on Mar. 31, 2020, retrieved from URL <https://www.youtube.com/watch?v=9_CTXRND3sU>, 1 page [Video Submission].

Visionline [online], "Automated 3D Model Creation," retrieved on May 14, 2020, retrieved from URL<https://www.visiononline.org/company-profile-detail.cfm/machine-vision/photoneo/company_id/1005, 2 pages.

wikipedia.org [online], "Powered exoskeleton," retrieved from URL <https://en.wikipedia.org/wiki/Powered_exoskeleton>, Mar. 2020, 12 pages.

(56) References Cited

OTHER PUBLICATIONS wyss.harvard.edu [online], "Soft Exosuits for Lower Extremity Mobility," Nov. 7, 2019, retrieved on Mar. 31, 2020, retrieved from URL <https://wyss.harvard.edu/technology/soft-exosuits-for-lower-extremity-mobility/>, 5 pages.

* cited by examiner

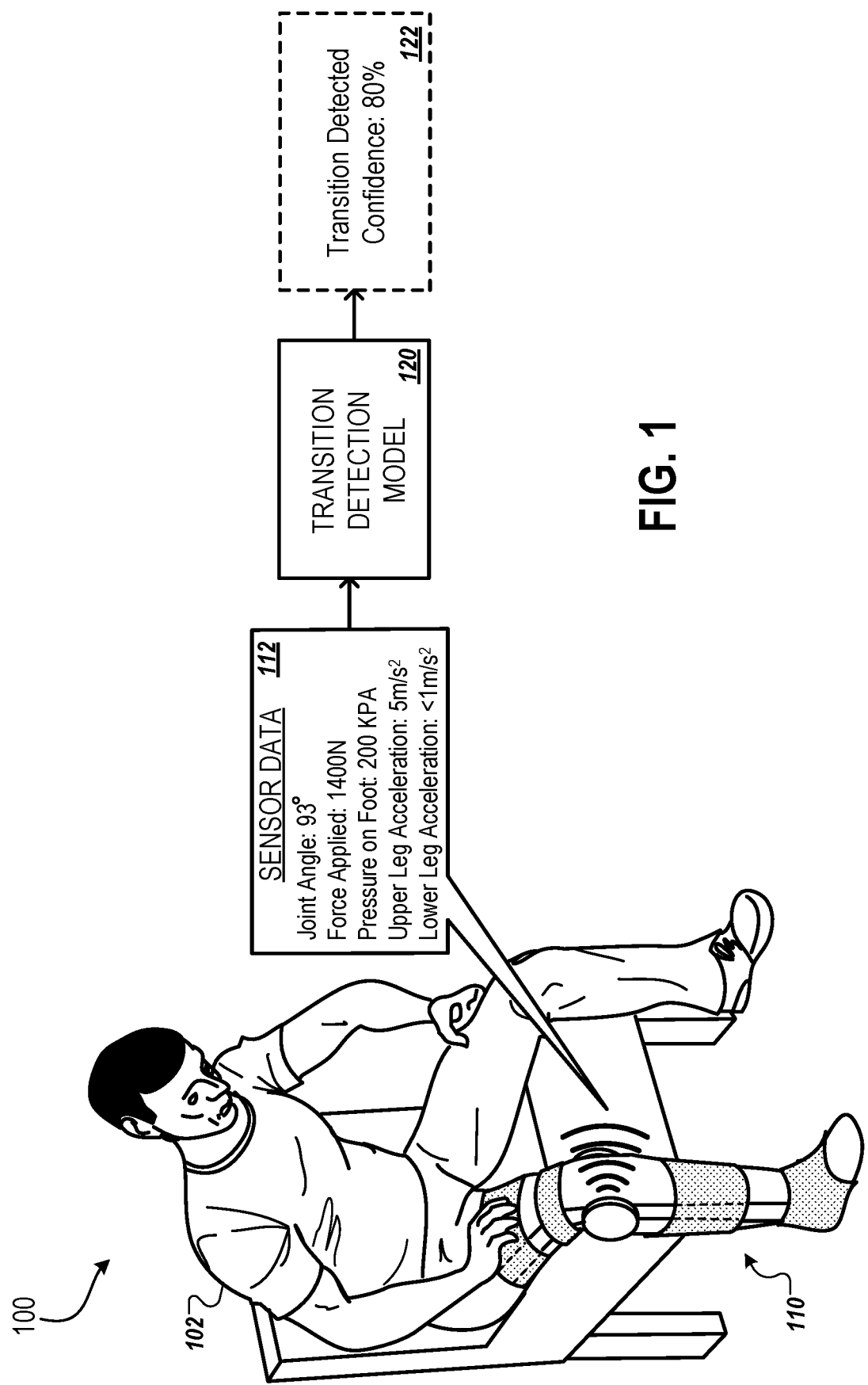

EXOSUIT ACTIVITY TRANSITION CONTROL

CROSS-REFERENCE TO RELATED APPLICATIONS

This application claims priority to Greek Application No. 20200100233, filed May 8, 2020, the contents of which are incorporated by reference herein.

FIELD

This disclosure generally relates to exosuits, such as exoskeletons.

BACKGROUND

Exosuits can provide mechanical benefits to those that wear them. These benefits can include increased stability and improved strength.

SUMMARY

A control system for a powered exosuit can include hardware and software components for detecting activity transitions and performing actions in response. The control system can be trained on various activities that the wearer of the exosuit can perform. For example, these activities can include sitting, walking, standing, climbing stairs, running, or the like. The control system can also be trained on transitions between activities, e.g., movement transitions. For example, these transitions can include the transition from walking to climbing stairs, the transition from sitting to standing, the transition from standing to walking, the transition of walking to running, or the like. The control system can perform one or more actions in response to detecting a transition or to detecting a specific transition. For example, the control system can change or select a control program for the powered exosuit in order to assist the wearer in making the transition for the type of transition detected.

The control system can include an activity detection model. The control system can use the activity detection model to determine the current activity that the wearer is performing. The activity detection model can include one or more algorithms or models, such as one or more machine learning algorithms or models. These algorithms or models can be trained on various activities that the wearer of the powered exosuit can perform, such as, for example, sitting, walking, standing, climbing stairs, running, or the like.

The control system can include a transition detection model. The control system can use the transition detection model to determine if the wearer is attempting to transition to a different activity and/or what transition is occurring. The transition detection model can receive output from the activity detection model to assist in determining if the wearer is attempting to transition to a different activity and/or what transition is occurring. The transition detection model can include one or more algorithms or models, such as one or more machine learning algorithms or models. These algorithms or models can be trained on various activity transitions that the wearer of the powered exosuit can make, such as, for example, the transition from walking to climbing stairs, the transition from sitting to standing, the transition from standing to walking, the transition of walking to running, or the like.

The control system can use data collected from various sensors on the powered exosuit. The control system can use this sensor data in determining a current activity performed by the wearer, if the wearer is transition to a different activity, the activity that the wearer is transitioning from, and/or the activity that the wearer is transitioning to.

In response to detecting an activity transition or a particular type of transition, the control system can perform one or more specific actions to assist the wearer in making the transition or to otherwise ease the transition. For example, the control system can adjust thresholds for performing other actions, can select or change a control program for the powered exosuit, can adjust the assistive force provided by the powered exosuit, can activate a set of safety rules for the powered exosuit, among others.

In one general aspect, a method includes: receiving sensor data for a powered exosuit; classifying whether the sensor data is indicative of a transition between different types of activities of a wearer of the powered exosuit; providing the classification to a control system for the powered exosuit; and controlling the powered exosuit based on the classification.

Implementations may include one or more of the following features. For example, in some implementations, classifying includes predicting, based on the sensor data, whether the wearer is currently transitioning between different types of activities.

In some implementations, the powered exosuit is a soft robotic exosuit configured to assist lower extremity mobility of the wearer of the powered exosuit.

In some implementations, the powered exosuit is arranged as actuated clothing, such that powered exosuit is attached to or embedded within a garment.

In some implementations, the sensor data indicates at least one of: parameters of the exosuit; physiological parameters for the wearer; or indications of interactions of the wearer with the powered exosuit.

In some implementations, the sensor data includes sensor data provided by one or more sensors of the powered exosuit, where the one or more sensors include at least one of: a position sensor; a motion sensor; an accelerometer; an inertial measurement unit; a potentiometer; an electrogoniometer; a pose detection sensor; a joint angle sensor; an encoder; a load sensor; a pressure sensor; a force sensor; a torque sensor; a strain gauge; a piezoresistive sensor; a gyroscope; an electromyographic (EMG) sensor; an electroencephalography (EEG) sensor; or an electrooculography sensor.

In some implementations, classifying whether the sensor data is indicative of a transition includes using a classifier that includes a machine learning model to classify whether the sensor data is indicative of a transition.

In some implementations, classifying whether the sensor data is indicative of a transition includes performing the classification using a classifier that includes a neural network, a support vector machine, a decision tree, a random forest model, a genetic algorithm, a Bayesian model, a Gaussian mixture model, a statistical model, or a rule-based model.

In some implementations, the classification indicates the occurrence of a transition between different types of activities of the wearer; where controlling the powered exosuit based on the classification includes changing an operating parameter for the powered exosuit based on the classification indicating the occurrence of a transition between different types of activities of the wearer.

In some implementations, the operating parameter includes at least one of a position, speed, direction, angle, force, or pose of the powered exosuit.

In some implementations, controlling the powered exosuit includes, based on the classification indicating the occurrence of a transition between different types of activities of the wearer, performing at least one of: initiating a movement of the powered exosuit; altering or discontinuing a movement in progress by the powered exosuit; changing an amount of force allowed to be exerted by the powered exosuit; changing a speed of movement allowed for the powered exosuit; changing a set of actions allowed to be performed by the powered exosuit; selecting a control program for the powered exosuit; altering a control program for the powered exosuit; changing a set of rules applied for controlling the powered exosuit; or changing a threshold or range used for controlling the powered exosuit.

In some implementations, controlling the powered exosuit includes, based on the classification indicating the occurrence of a transition between different types of activities of the wearer, performing at least one of: temporarily decreasing or removing an application of force by the powered exosuit; decreasing an amount of force allowed to be exerted by the powered exosuit; decreasing a speed of movement allowed for the powered exosuit; reducing a set of actions allowed to be performed by the powered exosuit; restricting a set of control programs allowed for the powered exosuit; activating one or more safety rules for controlling the powered exosuit; increasing a confidence level threshold required to initiate an action by the powered exosuit; or reducing or shifting a range boundary for an operating parameter of the powered exosuit to limit a degree of force or movement caused by the powered exosuit.

In some implementations, the powered exosuit is configured to use the classifier to detect transitions between different types of activities of the wearer in real time or substantially in real time.

In some implementations, the method includes: repeatedly acquiring sensor data for the powered exosuit to generate sensor data at each of multiple time periods; and using the classifier to classify whether each of the multiple time periods represent transitions between different types of activities of the wearer.

In some implementations, the classifying includes using a classifier is configured to predict the occurrence of a transition without providing output predicting an activity of the wearer.

In some implementations, the classifying includes using a classifier configured to predict whether a transition is occurring directly from feature data derived from the sensor data, without receiving input indicating activities or predicted activities of the wearer.

In some implementations, the classifying includes using a classifier configured to provide, as output, a confidence score indicating a likelihood that an input data set represents the occurrence of a transition between activities of the wearer.

In some implementations, the classifying includes using a classifier configured to classify whether a transition occurs between any of multiple predetermined types of activity of the wearer.

In some implementations, the multiple predetermined types of activity of the wearer include two or more of sitting, standing, walking, running, ascending stairs, or descending stairs.

In some implementations, the classifying includes using a classifier configured to generate a prediction whether a transition between types of activities occurs during a first time period based on (i) information derived from sensor data for the first time period and (ii) information derived from sensor data from one or more time periods prior to the first time period.

In some implementations, the classifier is configured to generate the classification based on information for one or more time periods prior to collection of the sensor data using at least one of a memory storing data for the one or more time periods, a recurrent structure of the classifier, or providing data corresponding to the one or more time periods to the classifier.

In some implementations, the powered exosuit includes an activity detection model configured to predict a classification for an activity of the wearer from among a plurality of predetermined activity types; where the method includes: using the activity detection model to generate an activity prediction for an activity of the wearer; and providing the activity prediction to the control system for the powered exosuit; where the powered exosuit is controlled based on both the (i) classification whether a transition is occurring and (ii) the activity prediction generated using the activity detection model.

In some implementations, the powered exosuit includes a transition detection model configured to predict the classification indicating the occurrence of a transition between different types of activities of the wearer; and where classifying whether the sensor data is indicative of a transition includes using the transition detection model to generate the classification as a transition prediction.

In some implementations, the classifier has been trained based on the wearer's own data.

In some implementations, the classifier has been trained based on data of other wearers.

In some implementations, using the classifier includes using the classifier on an ongoing basis to detect transitions between different types of activities of the wearer of the powered exosuit.

In some implementations, the classifier is a binary classifier; and where using the classifier includes using the binary classifier to indicate whether a transition is occurring or not.

In some implementations, the classifier is configured to classify one of a plurality of different types of transitions.

In some implementations, the different types of transitions include types for transitions between different pairs of activities.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 is perspective diagram of an example powered exosuit in use during an activity transition.

Like reference numbers and designations in the various drawings indicate like elements.

DETAILED DESCRIPTION

Figure 2A:
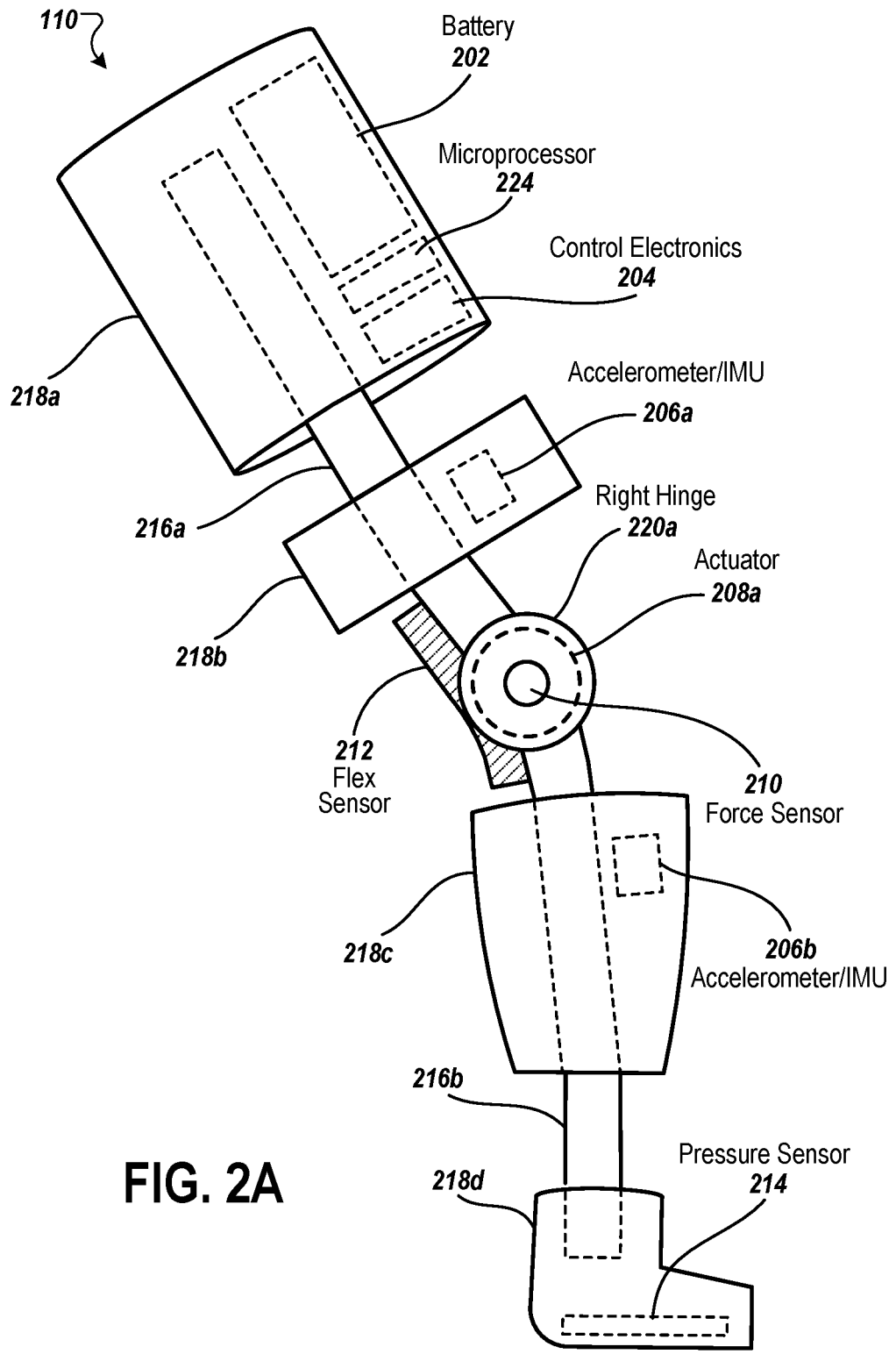
FIG. 2A is a diagram that illustrates an example powered exosuit with an activity transition control structure, and its hardware components.

A control system for a powered exosuit can include hardware and software components for detecting activity transitions and performing actions in response. The software components can include, for example, an activity detection model and a transition detection model. The control system can be trained on various activities that the wearer of the exosuit can perform. For example, these activities can include sitting, walking, standing, climbing stairs, running, or the like. The control system can also be trained on transitions between activities, e.g., movement transitions. For example, these transitions can include the transition from walking to climbing stairs, the transition from sitting to standing, the transition from standing to walking, the transition of walking to running, or the like. The control system can perform one or more actions in response to detecting a transition or to detecting a specific transition. For example, the control system can change or select a control program for the powered exosuit in order to assist the wearer in making the transition for the type of transition detected.

The control system can be part of and/or used with a variety of powered exosuits. For example, the control system can be used with a single leg exosuit, a lower leg exosuit, a lower body exosuit, an arm exosuit, an upper body exosuit, or the like. A powered exosuit includes one or more motors or actuators that can be used to apply a force on a wearer (e.g., at a joint), to lock components of the exosuit, and/or to unlock components of the exosuit. For example, an actuator can be used to apply a torque at a knee joint of an exosuit wearer in order to assist the wearer in climbing a set of stairs.

FIG. 1 is perspective diagram 100 of an example powered exosuit 110 in use during an activity transition. The powered exosuit 110 includes a control system for detecting activity transitions and performing actions in response. The powered exosuit 110 can use the transition detection to change a behavior of the powered exosuit 110 to, for example, better assist the wearer 102 and/or to prevent injury to the wearer 102. As shown, a wearer 102 of the powered exosuit 110 has started to transition between activities. Specifically, the wearer 102 is transitioning from sitting to standing.

The powered exosuit 110 can be, for example, a powered exoskeleton. The powered exosuit 110 can be a mechanically assistive piece of clothing.

As will be discussed in more detail with respect to FIGS. 2A-2B, the powered exosuit 110 includes a number of sensors. These sensors output sensor data 112. The sensor data 112 can include, for example, an amount of force or torque at a hinge of the exosuit (e.g., that can be indicative of the amount of force or torque at a joint of the wearer 102), an amount of force or torque at a joint of the wearer 102, an angle of a hinge of the exosuit 110 (e.g., that can be indicative of an angle of a joint of the wearer 102), an angle of one or more the wearer 102's joints, one or more pressures placed on the exosuit 110 or placed on particular portion of the exosuit 110 (e.g., that can be indicative of one or more pressures experienced by the wearer 102), an acceleration of the exosuit 110 (e.g., that can be indicative of an acceleration experienced by the wearer 102, a limb of the wearer 102, or a portion of a limb of the wearer 102), multiple accelerations of different portions of the exosuit 110 (e.g., that can be indicative of acceleration experienced by different limbs of the wearer 102, and/or by different portions of a limb of the wearer 102).

The sensors can include force sensors, torque sensors, pressure sensors, inertial measurement units and/or accelerometers, flex sensors such as electogoniometers, or the like.

One or more of the sensors can be calibrated based on characteristics of the wearer 102. For example, one or more of the sensors can be calibrated based on a weight of the wearer 102 and/or based on a height of the wearer 102.

As an example, as shown, the sensor data 112 includes a right knee joint angle of the wearer 102, e.g., the angle between the wearer 102's right upper leg and right lower leg. The sensor data 112 also includes a force currently applied to the right knee joint of the wearer 102, a pressure on the wearer 102's right foot, an acceleration of the wearer 102's upper leg, and an acceleration of the wearer 102's lower leg.

In some implementations, the sensor data 112 includes data outputted by one or more algorithms. For example, the force applied to the wearer 102's knee could have been calculated by the exosuit 110 applying an algorithm to the output of a sensor that is configured to measure force or torque at the knee hinge of the exosuit 110. The algorithm can output an estimated force on the wearer 102's knee joint based on the sensor's force or torque output. The algorithm can also take into consideration other senor outputs and/or known characteristics of the wearer 102, such as a weight of the wearer 102 and/or a height of the wearer 102. Where there are multiple sensors measuring the same data, the exosuit 110 can take the average of the sensors' outputs. For example, there can be a right-side force sensor integrated into a right hinge of the exosuit 110 and a left-side force sensor integrated into a left hinge of the exosuit 110.

The exosuit 110 provides the sensor data 112 to a transition detection model 120. The transition detection model 120 can be part of a control system for the exosuit 110. The transition detection model 120 can include one or more algorithms or models, such as one or more machine learning algorithms or models. These algorithms or models can be trained on various activity transitions that the wearer 102 of the exosuit 110 can make, such as, for example, the transition from walking to climbing stairs, the transition from sitting to standing, the transition from standing to walking, the transition of walking to running, or the like. The transition detection model 120 can be trained using data collected from the powered exosuit 110 and/or the wearer 102. For example, the transition detection model 120 can be trained using feedback provided by the wearer 102. The feedback provided by the wearer 102 can indicate whether a prediction by the transition detection model 120 was correct, e.g., can indicate whether a determination that a transition had occurred was correct. Alternatively or additionally, the transition detection model 120 can be trained, e.g., initially trained, using data collected from other exosuits, and/or from wearers of other exosuits. These other exosuits can be of the same type as the powered exosuit 110.

A transition can include, for example, the transition from walking to climbing stairs, the transition from sitting to standing, the transition from standing to walking, the transition of walking to running, or the like. Each of the specific transitions can be considered by the transition detection model 120 a type of transition.

The transition detection model 120 can determine an indication of whether the wearer 102 is in the process of transitioning between activities, and/or the specific type of transition that is occurring. The transition detection model 120 can determine a confidence of a transition, or of a specific type of transition, occurring. The transition detection model 120 can output the determined confidence in addition to a determination of whether a transition, or a specific type of transition, is occurring. For example, as shown, the transition detection model 120 has provided output 122 that indicates that a transition has been detected with 80% confidence.

During a transition between activities is when activity models, e.g., models used to determine an activity performed by a wearer of an exosuit, are most likely to make a mistake. The powered exosuit 110 can use the transition detection to change a behavior of the powered exosuit 110 to, for example, better assist the wearer 102 and/or to prevent injury to the wearer 102. For example, if the exosuit 110 is currently running a control program for sitting and the sensor data 112 indicates that the wearer 102 is transitioning to a standing activity, the exosuit 110 can switch to a control program for a sitting to standing transition, or can activate one or more safeguards. The control program can, for example, provide additional assistance as the wearer 102 attempts to stand up or can lock a joint of the exosuit 110.

In some implementations, the transition detection model 120 only outputs a confidence of a transition, or of a specific type of transition, occurring.

As will be discussed in more detail with respect to FIG. 2B, the transition detection model 120 can receive output from an activity detection model 230 to assist in determining if the wearer 102 is attempting to transition to a different activity and/or what type of transition is occurring. This output can include an indication of the most recently detected or determined activity that the wearer 102 was performing. For example, the activity detection model can provide an indication that the wearer 102 is, or was most recently, sitting. The transition detection model 120 can use this information to lookup the activity, or activities, that typically follows sitting, e.g., standing. Alternatively, the activity detection model can also provide an indication of the activity that typically follows the last determined activity, or an indication of those activities that typically follow the last determined activity.

As will be discussed in more detail with respect to FIG. 2B, the transition detection model 120 can also determine one or more actions that the control system of the exosuit 110 should perform. Alternatively, the control system can determine one or more action to perform based on the output of the transition detection model 120. For example, the control system can adjust thresholds for performing other actions, can select or change a control program for the powered exosuit 110, can adjust the assistive force provided by the powered exosuit 110, can activate a set of safety rules for the powered exosuit 110, among others. The one or more actions taken can depend on the type of transition detected. For example, if the transition detection model 120 determines that the wearer is transitioning from walking to running, the control system of the exosuit 110 can switch from a walking control program to a running control program. If the transition detection model 120 determines that the wearer 102 is transitioning from standing to climbing stairs, the control system of the exosuit 110 can increase the amount of force provided by actuators on exosuit 110 to assist the wearer 102 in climbing the stairs.

For example, based on the output 122, the exosuit 110 can provide torque assistance through one or more onboard actuators in order to assist the wearer 102 in standing up, can increase the torque output of one or more onboard actuators in order to provide additional assistance to the wearer 102 during their attempt to stand up, can reduce the amount of rotation permitted at the wearer 102's right knee joint (e.g., by reducing the amount of rotation permitted at one or more hinges of the powered exosuit 110) to reduce the likelihood of the wearer 102 being injured as they attempt to stand up, can effectively lock the wearer 102's right knee joint (e.g., by locking one or more hinges of the powered exosuit 110) to reduce the likelihood of the wearer 102 being injured as they attempt to stand up, can run a control program for the transition from sitting to standing, can run a control program or activate one or more safeguards to provide increased stability, or the like.

In some implementations, the sensor data 112 is provided to a remote management system. The transition detection model 120 can be part of the management system. If a transition is detected, or if a specific type of transition is detected, the management system can send instructions to the exosuit 110 wirelessly. The remote management system can include one or more computers, or one or more servers. The remote management system can be part of a cloud computing platform.

In some implementations, the exosuit 110 can send information to a wireless device of the wearer 102. This information can indicate, for example, the activities performed by the wearer 102 and/or the transitions detected. For example, as will be discussed in more detail with respect to FIG. 3, the wireless device can present charts that provide an indication of the activities performed by the wearer 102 and the transitions between activities over a time period (e.g., one hour, twelve hours, one day, one week, or the like). The wearer 102 can provide feedback through the wireless device, e.g., feedback indicating that a particular activity was or was not performed, and/or that a transition did or did not occur. This feedback can be used by the control system of the exosuit 110 to update the transition detection model 120 and/or the activity detection model.

FIG. 2A is a diagram that illustrates the powered exosuit 110 with an activity transition control structure, and its hardware components. The various components of the powered exosuit 110 can be used to, for example, collect data on the wearer 102, analyze the collected data to determine one or more assistive actions to perform, and provide assistance to the wearer 102 by performing the assistive actions. This type of monitoring and reactive assistance can provide the wearer 102 a better quality of life by, for example, reducing injuries that the wearer 102 might otherwise experience due to not receiving assistance or not receiving assistance appropriate for current circumstances, e.g., when the wearer 102 is transitioning between activities.

The powered exosuit 110 includes a battery 202. The battery 202 can provide power to various electronic components of the powered exosuit 110. The battery 202 can be a lithium-ion battery.

The powered exosuit 110 also includes a microprocessor 224 and control electronics 204. As will be described in more detail with respect to FIG. 2B, the microprocessor 224 can receive outputs from the one or more sensors of the powered exosuit 110, such as output from accelerometers/inertial measurement units (IMUs) 206a-206b, a force sensor 210, a flex sensor 212, and/or a pressure sensor 214. The microprocessor 224 can use this sensor data to, for example, determine one or more actions to perform. The microprocessor 224 can send instructions to the control electronics 204 to carry out the actions, e.g., the control electronics 204 can translate the instructions into control signals to send to an actuator 208a.

Figure 2B:
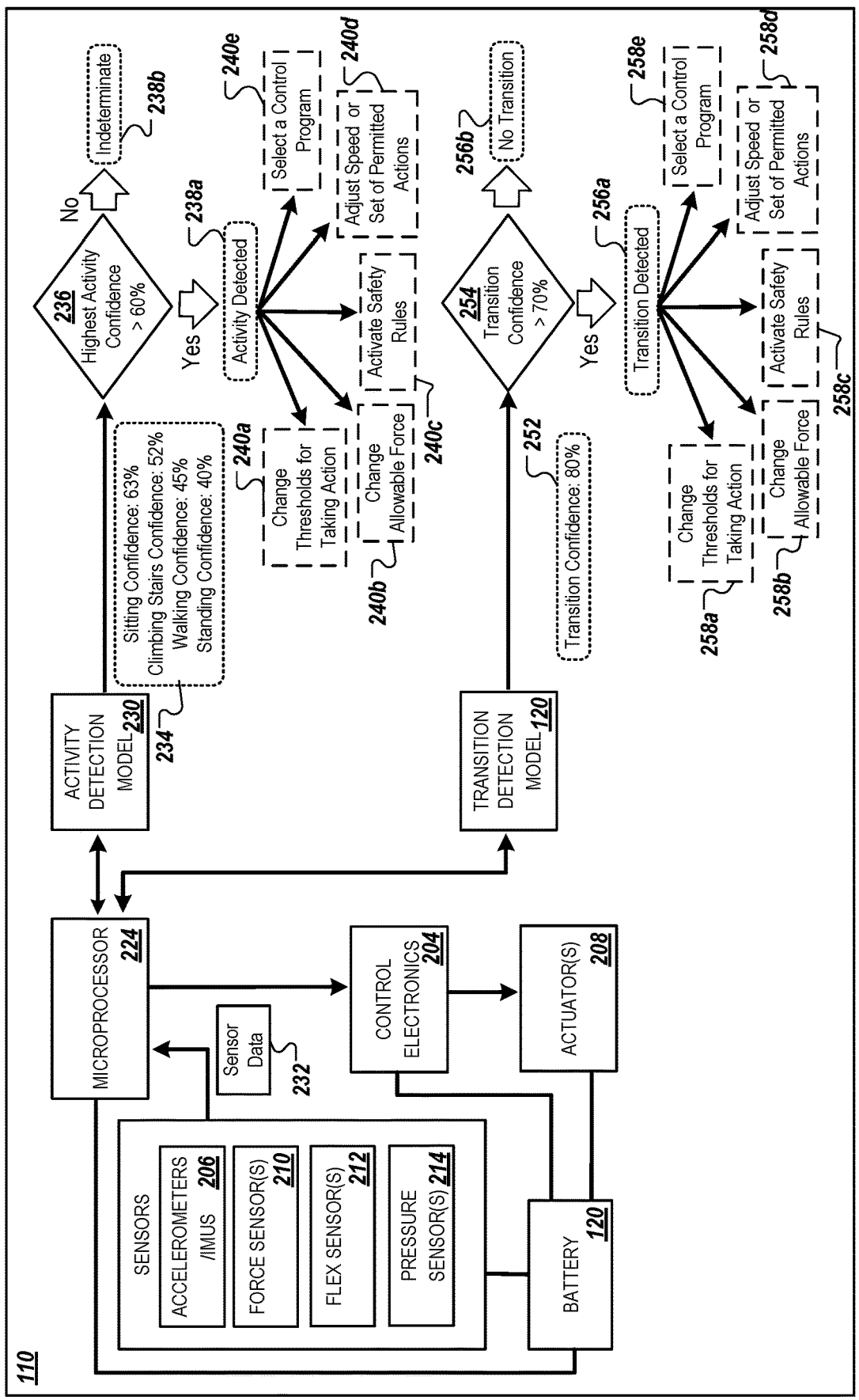
FIG. 2B is a block diagram that illustrates an example powered exosuit with an activity transition control structure, and its hardware and software components.

As will be discuss in more detail with respect to FIG. 2B, an activity detection model 230 and the transition detection model 120 can be run on the microprocessor 224. The output of the activity detection model 230 and/or the transition detection model 120 can indicate one or more actions to perform, or can be used by the microprocessor 224 to determine one or more actions to perform. The activity detection model 230 and the transition detection model 120 can be stored on memory of an onboard data store of the powered exosuit 110. The microprocessor 224 can access data stored on the data store. Alternatively, the activity detection model 230 and the transition detection model 120 can be part of a remote management system that can communicate with the powered exosuit 110.

The microprocessor 224 can use the output of the accelerometer/IMU 206a to determine, for example, an acceleration of the wearer 102's upper leg and/or an orientation of the wearer 102's upper leg. Similarly, the microprocessor 224 can use the output of the accelerometer/IMU 206b to determine, for example, an acceleration of the wearer 102's lower leg and/or an orientation of the wearer 102's lower leg. The microprocessor 224 can compare the outputs of the accelerometers/IMUs 206a-206b. The outputs of the accelerometers/IMUs 206a-206b and/or the differences between the outputs can indicate an orientation of the wearer 102, an activity being performed by the wearer 102, whether a transition is occurring, and/or the type of transition that is occurring. The microprocessor 224 can use the output of the accelerometers/IMUs 206a-206b and/or the differences between the outputs in determining an orientation of the wearer 102, an activity being performed by the wearer 102, whether a transition is occurring, and/or the type of transition that is occurring. For example, if the accelerometer/IMU 206a provides output of 5 m/s² and an upper leg angle of 100 degrees and if the accelerometer/IMU 206b provides output of less than 1 m/s² and an angle of 0 degrees, then the microprocessor 224 can determine that the wearer 102 is transitioning from sitting to standing with a high confidence (e.g., confidence over 70%, over 80%, over 90%, or the like). The microprocessor 224 can make this determination using the transition detection model 120.

The microprocessor 224 can use the flex sensor 212 to determine an angle between the wearer 102's upper leg and lower leg, e.g., the angle of the wearer 102's knee joint. The angle between the wearer 102's upper leg and lower leg, and/or the changes in the angle between the wearer 102's upper leg and lower leg can indicate the activity that the wearer 102 is performing and/or whether a transition is occurring. For example, if the changes in the angles between the wearer 102's upper leg and lower leg are changing periodically or near periodically, and/or if the angles between the wearer 102's upper leg and lower leg are within a particular range of values, then the microprocessor 224 can determine the wearer 102 is currently walking. In making this determination, the microprocessor 224 can determine confidences for each of the activities that the wearer 102 might be performing. For example, the confidence of the wearer 102 walking can be determined to be 75%, the confidence of the wearer 102 running can be 22%, and the confidence of all other activities combined can be 3%. The microprocessor 224 can use the activity detection model 230 to make the determination that the wearer 102 is currently walking. The flex sensor 212 can be an electogoniometer.

The control electronics 204 and/or microprocessor 224 can use the pressure sensor 214 to determine the amount of pressure on the wearer 102's foot. This pressure can indicate or help to indicate an activity that the wearer 102 is currently performing, whether a transition is occurring, and/or a type of transition that is occurring. The microprocessor 224 can use the output of the pressure sensor 214 in determining an activity that the wearer 102 is currently performing, whether a transition is occurring, and/or a type of transition that is occurring. For example, if the output of the pressure sensor 214 indicates that the wearer 102 is placing between 18% and 22% of their body weight on their right foot over the last ten seconds, then the microprocessor 224 can determine that the wearer 102 is currently sitting. In making this determination, the microprocessor 224 can determine confidences for each of the activities that the wearer 102 might be performing. For example, the confidence of the wearer 102 sitting can be determined to be 85%, the confidence of the wearer 102 standing can be 14%, and the confidence of all the other activities combined can be 1%. The microprocessor 224 can use the activity detection model 230 to make the determination that the wearer 102 is currently sitting, and/or to determine the confidence of each of the activities.

Similarly, the microprocessor 224 can use this output of the pressure sensor 214 to reduce the confidence of other possible activities that the wearer 102 is performing and/or the types of transitions that can be occurring. For example, this output of the pressure sensor 214 can be used to significantly lower the confidence of the wearer 102 climbing stairs, walking, or running. Moreover, this output of the pressure sensor 214 can be used to significantly lower the confidence of the wearer 102 transitioning from sitting to standing, transitioning from walking to running, transitioning from walking to climbing stairs, or the like.

The structural components of the powered exosuit 110 include, for example, a right side upper bar 216a, a right side lower bar 216b, a right hinge 220a that the bars 216a-216b are coupled to, a first cuff 218a that corresponds to an upper leg of the wearer 102, a second cuff 218b that corresponds to the upper leg of the wearer 102, a third cuff 218c that corresponds to a lower leg of the wearer 102, and a fourth cuff 218d that corresponds to a foot of the wearer 102. The powered exosuit 110 can also include a left side upper bar, a left side lower bar, and a left hinge.

The actuator 208a can be used to apply a torque between the right side upper bar 216a and the right side lower bar 216b. The amount of torque applied by the actuator 208a can be controlled by the control electronics 204 and/or the microprocessor 224. The amount of torque applied by the actuator 208a can correspond to a control program that the control electronics 204 and/or microprocessor 224 is currently running. The control program can correspond to a particular activity, to any transition, and/or to a particular transition. For example, the control program currently being run by the microprocessor 224 can be a control program for walking.

The control electronics 204 and/or the microprocessor 224 can generate an output to send to the actuator 208a. The particular output sent to the actuator 208a can depend on the current control program running and/or on the received sensor outputs. The output sent to the actuator 208a can indicate an amount of torque or force that the actuator 208a should apply, e.g., an amount of torque that the actuator 208a should apply to the bars 216a-216b.

The actuator 208a can be a right side actuator. The powered exosuit 110 can also include a left side actuator. Similar to how the actuator 208a is integrated in the right hinge 220a, the left side actuator can be integrated in a left hinge.

In some implementations, the powered exosuit 110 also includes a transmitter and/or a receiver. As an example, a transmitter can be used by the control electronics 204 to output sensor data to a remote management system. Similarly, a transmitter can be used by the control electronics 204 to output sensor data, determined activities, and/or determined transitions to a computing device of the wearer 102, such as a smart phone of the wearer 102. As another example, the powered exosuit 110 can receive instructions from a remote management system through an onboard receiver, e.g., instructions to change a control program of the powered exosuit 110. Similarly, the powered exosuit 110 can receive instructions and/or feedback from a computing device of the wearer 102 through a receiver of the powered exosuit 110. The feedback can be used by the powered exosuit 110 to update or train the activity detection model 230 shown in FIG. 2B and/or the transition detection model 120.

In some implementations, the powered exosuit 110 includes additional and/or different. For example, the powered exosuit 110 can include additional force sensors, pressure sensors, flex sensors, or the like.

FIG. 2B is a block diagram that illustrates the powered exosuit 110 with an activity transition control structure, and its hardware and software components. The various components of the powered exosuit 110 can be used to, for example, collect data on the wearer 102, analyze the collected data to determine one or more assistive actions to perform, and provide assistance to the wearer 102 by performing the assistive actions.

The powered exosuit 110 includes various sensors. These sensors include the accelerometers/IMUs 206, the force sensor(s) 210, the flex sensor(s) 212, and the pressure sensor(s) 214. The output of the sensors is provided to the microprocessor 224. The microprocessor 224 can be part of the control electronics 204 shown in FIG. 2A. The microprocessor 224 can be the control electronics 204 shown in FIG. 2A.

The powered exosuit 110 also includes the actuator(s) 208. The actuator(s) 208 are controlled be the microprocessor 224 through the control electronics 204. For example, the actuator(s) 208 can receive control signals from the control electronics 204 based on instructions sent to the control electronics 204 from the microprocessor 224. As will be discussed in more detail below, the instructions and/or the control signals can be generated based on outputs of the activity detection model 230 and/or the transition detection model 120.

The sensors 206, 210, 212, and 214 can receive power from the battery 202. The microprocessor 224, control electronics 204, and actuator(s) 208 can also receive power from the battery 202.

The sensors 206, 210, 212, and/or 214 output sensor data 232 to the microprocessor 224. The sensor data 232 can include sensor data from each of the sensors 206, 210, 212, and/or 214. The microprocessor 224 can provide the sensor data 232 to the activity detection model 230 and/or the transition detection model 120. That is, the activity detection model 230 and/or the transition detection model 120 can use the sensor data 232 as input. Alternatively, the microprocessor 224 can modify the sensor data 232 before sending it the activity detection model 230 and/or the transition detection model 120. For example, the microprocessor 224 can normalize the sensor data 232, can calibrate the sensor data 232 based on characteristics of the wearer 102 (e.g., a weight and/or height of the wearer 102), and/or can apply an algorithm to the sensor data 232 (e.g., to approximate a force on the wearer 102's knee joint based on output of the force sensor(s) 210). The activity detection model 230 and/or the transition detection model 120 can use this modified sensor data as input.

The microprocessor 224 can use the activity detection model 230 to determine a current activity that the wearer 102 is performing, and/or to determine a confidence for one or more activities that the wearer 102 might be performing, e.g., based on the sensor data 232. The activity detection model 230 can be a machine learning model. The activity detection model 230 can include one or more algorithms or models, such as one or more machine learning algorithms or models. The activity detection model 230 can be trained on various activities that the wearer 102 of the powered exosuit 110 can perform, such as, for example, sitting, walking, standing, climbing stairs, running, or the like.

The activity detection model 230 can be can be run on the microprocessor 224. The activity detection model 230 can be part of the control system of the powered exosuit 110. The activity detection model can be trained using data collected from the exosuit 110 and/or data collected from the wearer 102. For example, the activity detection model 230 can be trained using feedback provided by the wearer 102. The feedback provided by the wearer 102 can indicate the accuracy of a prediction by the activity detection model 230, e.g., can indicate whether an identified activity being performed by the wearer 102 was correct. Alternatively or additionally, the activity detection model 230 can be trained, e.g., initially trained, using data collected from other exosuits, and/or from wearers of other exosuits. These other exosuits can be of the same type as the powered exosuit 110.

The activity detection model 230 can be or include a machine learning model, such as, for example, a classifier network (e.g., a decision tree), a recurrence neural network (RNN), a deep neural network (DNN), or the like. For example, the output of the classifier network of the activity of detection model 230 can indicate the current activity that the wearer 102 is currently performing, e.g., sitting, standing, walking, climbing stairs, running, or the like.

The activity detection model 230 can analyze the sensor data 232 it receives from the microprocessor 224. In analyzing the sensor data 232, the activity detection model 230 can determine confidence scores for one or more activities that the wearer 102 might be performing. For example, the activity detection model 230 can determine confidence scores for each activity that the wearer 102 might be performing. In analyzing the sensor data 232, the activity detection model 230 can produce an output 234. The output 234 can indicate the calculated confidence scores for the one or more activities that the wearer 102 might be performing. The activity detection model 230 can use outputs from the transition detection model 120 in generating the output 234.

The output 234 can be provided to, for example, the transition detection model 120. The transition detection model 120 can use the output 234 in determining whether a transition is occurring, a specific type of transition that is occurring, a confidence of whether a transition is occurring, a confidence of specific type of transition that is occurring, and/or a confidence of one or more types of transitions that might be occurring.

The output 234 can be compared to a threshold 236. The threshold 236 can be a confidence threshold. The threshold 236 can, for example, require a confidence score greater than 60%, 70%, 80%, or the like. If any of the determined confidence scores found in the output 234 are greater than the threshold 236, then the activity detection model 230 determines that an activity is detected and produces an output 238a. If only one activity has a confidence score that is greater than the threshold 236, then the activity detection model 230 can determine that the current activity that the wearer 102 is performing is the one activity. An indication of this activity can be included in the output 238a. If multiple activities have a confidence score that is greater than the threshold 236, then the activity detection model 230 can determine that the current activity that the wearer 102 is performing is the activity with the highest confidence score. The activity detection model 230 can use outputs from the transition detection model 120 in generating the output 238a.

The output 238a indicates that an activity has been detected. The powered exosuit 110 can use the activity detection to change or to maintain a behavior of the powered exosuit 110 to, for example, better assist the wearer 102 and/or to prevent injury to the wearer 102. For example, if the exosuit 110 is currently running a control program for standing and activity detection model 230 indicates that the wearer 102 has started running, the exosuit 110 can switch to running a control program for running that can provide the user greater powered assistance, increased stability, quicker joint rotation, greater joint rotation, or the like. Similarly, if the exosuit 110 is currently running a control program for walking and the activity detection model 230 indicates that the wearer 102 is still walking, the exosuit 110 can keep running the control program for walking to ensure that the wearer 102 is receiving the correct assistance.

The output 238a can be provided to, for example, the transition detection model 120. The output 238a can be a strong indicator that a transition is not currently occurring. For example, the output 238a can be used by the exosuit 110 to temporarily increase a transition threshold 254. The transition detection model 120 can use the output 238a in determining whether a transition is occurring, a specific type of transition that is occurring, a confidence of whether a transition is occurring, a confidence of specific type of transition that is occurring, and/or a confidence of one or more types of transitions that might be occurring.

If none of the determined confidences found in the output 234 are greater than the threshold 236, then the activity detection model 230 determines that it is unsure of the activity that the wearer 102 is performing and produces an output 238b. The output 238b indicates that the activity detection model 230 is unable to determine the activity that the wearer 102 is currently performing. The output 238b can be a strong indicator that the wearer 102 is transitioning between activities, e.g., that a transition is occurring. As an example, the output 238b can be used by the exosuit 110 to temporarily decrease the transition threshold 254. The activity detection model 230 can use outputs from the transition detection model 120 in generating the output 238b.

The powered exosuit 110 can use the indeterminate finding to change a behavior of the powered exosuit 110 to, for example, better assist the wearer 102 and/or to prevent injury to the wearer 102. For example, if the activity detection model 230 produces the output 238b, the exosuit 110 can activate one or more safety rules meant to safeguard the wearer 102 such as, for example, increasing assistive force output, providing improved stability, reducing the allowable rotation at a joint, locking a joint to prevent rotation, or the like.

The output 238b can be provided to, for example, the transition detection model 120. The transition detection model 120 can use the output 238b in determining whether a transition is occurring, a specific type of transition that is occurring, a confidence of whether a transition is occurring, a confidence of specific type of transition that is occurring, and/or a confidence of one or more types of transitions that might be occurring.

If an activity is detected and/or determined, e.g., if output 238a is produced by the activity detection model 230, the activity detection model 230 can trigger one or more actions 240a-240e. The actions 240a-240e can be carried out by the activity detection model 230 and/or the microprocessor 224. A first action 240a is changing of thresholds to take an action. For example, as is explained in more detail below, one or more of the actions 240a-240e can have a corresponding threshold or a corresponding threshold range. If the action 240a is taken, the threshold or threshold corresponding to one or more of the actions 240a-240e can be changed. For example, running can be considered a higher risk activity. Accordingly, if the determined activity is running, the activity detection model 230 can enlarge a threshold range corresponding to activating safety rules of a third action 258c.

A second action 240b provides for the activity detection model 230 or microprocessor 224 changing the allowable force. This can include changing the amount of force that a force sensor detects before power assistance is provided by the actuator(s) 208. Additionally or alternatively, this can include changing the amount of force or torque applied by the actuator(s) 208. The allowable force, and/or the force or torque applied by the actuator(s) 208 can depend on the type of activity detected and/or the confidence score determined for the activity.

The third action 240c provides for the activity detection model 230 or microprocessor 224 activating one or more safety rules. The actual safety rules can be used, for example, to improve stability provided by the powered exosuit 110, to increase the amount of assistance provided by the powered exosuit 110 (e.g., by activating the actuator(s) 208 or increasing the force output of the actuator(s) 208), to decrease the amount of assistance provided by the powered exosuit 110 (e.g., by deactivating the actuator(s) 208 or decreasing the force output of the actuator(s) 208), to lock a hinge of the exosuit 110, and/or to unlock a hinge of the exosuit 110. The one or more safety rules activated can depend on the type of activity detected and/or the confidence score determined for the activity.

The fourth action 240d provides for the activity detection model 230 or microprocessor 224 adjusting a speed or set of permitted actions. The speed or permitted action adjustment can be used, for example, to limit the speed that the exosuit 110 allows the wearer 102 to walk or run, to increase the speed that the exosuit 110 allows the wearer 102 to walk or run, to decrease the maximum allowed flex at a hinge of the powered exosuit 110, to increase the maximum allowed flex at a hinge of the powered exosuit 110, or the like. The speed or permitted action adjustment made can depend on the type of activity detected and/or the confidence score determined for the activity.

The fifth action 240e provides for the activity detection model 230 or microprocessor 224 selecting or changing a control program. There can be, for example, a control program for one or more of the activities. For example, there can be a control program for standing, walking, running, and climbing stairs. There can be, for example, a control program for each of the activities that wearer 102 can perform.

The control program selected can depend on the type of activity detected and/or the confidence score determined for the activity.

The one or more actions of the actions 240a-240e performed can depend on the confidence score corresponding to the determined activity. That is, one or more of the actions 240a-240e can have a corresponding threshold or a corresponding threshold range, such that an action of the actions 240a-240e will only be performed if the confidence score of the determined activity meets a corresponding threshold of that action. For example, if the activity detection model 230 determines a confidence score of 61% for walking it may activate one or more safety rules of action 240c and select a walking control program of action 240e. Whereas, if the activity detection model 230 determines a confidence score of 91% for walking it may select a walking control program of action 240e without activating safety rules of action 240c. In this example, the action 240c can have a threshold of below 70%, or a threshold range between 70% and the threshold 236.

In some implementations, instead of comparing the output 234 to a single threshold, the activity detection model 230 compares the output 234 to multiple thresholds and/or threshold ranges. Each of these thresholds and/or threshold ranges can correspond to a single discrete option. For example, there can be a corresponding threshold or threshold range for each of the actions 240a-240e. There can also be multiple corresponding thresholds or thresholds ranges for each of the actions 240a-240e, where each of the thresholds or threshold ranges for a given actions corresponds to a particular activity (e.g., sitting, climbing stairs, walking, etc.).

As an example, the first action 240a and the second action 240b can have a threshold range from 40% to 65% for sitting, the third action 240c and the fifth action 240e can have a threshold of 70% for sitting, and the fourth action 240d can have a threshold range of 50% to 59% for sitting. Accordingly, based on the output 234, the exosuit 110 (e.g., the microprocessor 224) would perform the first action 240a and the second action 240b, but would refrain from performing the actions 240c-240e.

In some implementations, instead of comparing the output 234 to a single threshold, the transition detection model 120 uses the output 234 in one or more algorithms, e.g., as an input variable. For example, there may be an algorithm corresponding to the each of the actions 240a-240e, or there may be multiple algorithms corresponding to each of the actions 240a-240e, e.g., with each algorithm for a particular action corresponding to a particular activity (e.g., sitting, climbing stairs, walking, standing, etc.).

As an example, there can be an algorithm for the second action 240b corresponding to sitting that uses the output 234 as input. The algorithm can use the percentage (e.g., 63%) in the output 234 to calculate how to throttle the one or more actuators 208.

As previously mentioned, the transition detection model 120 can determine an indication of whether the wearer 102 is in the process of transitioning between activities, and/or the specific type of transition that is occurring. The transition detection model 120 can determine a confidence of a transition, or of a specific type of transition, occurring. The transition detection model 120 can output a determination of whether a transition is occurring, a determination of a specific type of transition that is occurring, a confidence of whether a transition is occurring, a confidence of specific type of transition that is occurring, and/or a confidence of one or more types of transitions that might be occurring.

The transition detection model 120 can be run on the microprocessor 224. The transition detection model 120 can be part of the control system of the powered exosuit 110. The transition detection model 120 can include one or more algorithms or models, such as one or more machine learning algorithms or models. These algorithms or models can be trained on various activity transitions that the wearer 102 of the powered exosuit 110 can make, such as, for example, the transition from walking to climbing stairs, the transition from sitting to standing, the transition from standing to walking, the transition of walking to running, or the like. The transition detection model 120 can be trained using data collected from the powered exosuit 110 and/or the wearer 102. For example, the transition detection model 120 can be trained using feedback provided by the wearer 102. The feedback provided by the wearer 102 can indicate whether a prediction by the transition detection model 120 was correct, e.g., can indicate whether a determination that a transition had occurred was correct. Alternatively or additionally, the transition detection model 120 can be trained, e.g., initially trained, using data collected from other exosuits, and/or from wearers of other exosuits. These other exosuits can be of the same type as the powered exosuit 110.

The transition detection model 120 can be or include a machine learning model, such as, for example, a classifier network (e.g., a binary classifier, a decision tree, or the like), a recurrence neural network (RNN), a deep neural network (DNN), or the like. For example, the output of a binary classifier network can indicate whether a transition is occurring or not. A decision tree could additionally or alternatively be used to indicate the type of transition that is occurring, e.g., the wearer 102 transitioning from sitting to standing, from standing to walking, from walking to climbing stairs, or the like.

The transition detection model 120 can analyze the sensor data 232 that it receives from the microprocessor 224. In analyzing the sensor data 232, the transition detection model 120 can determine whether a transition is occurring, determine a confidence score for whether a transition is occurring, determine a type of transition that is occurring, and/or confidence scores for the types of transitions that might be occurring. For example, the transition detection model 120 can determine a single confidence score for a transition occurring. In analyzing the sensor data 232, the transition detection model 120 can produce an output 252. The output 252 can indicate whether a transition is occurring, and/or a confidence in whether a transition is occurring. The output 252 can additionally or alternatively indicate a type of transition that is occurring, and/or confidence scores for the types of transitions that might be occurring. The transition detection model 120 can use the outputs, 234, 238a, and/or 238b in generating the output 252.

The output 252 can be provided to, for example, the activity detection model 230. The activity detection model 230 can use the output 252 in determining an activity being performed by the wearer 102, and/or confidence scores for activities that the wearer 102 might be performing.

The output 252 can be compared to a threshold 254. The threshold 254 can be a confidence threshold. The threshold 254 can, for example, require a confidence score greater than 70%, 80%, 90%, or the like. If a determined confidence score found in the output 252 is greater than the threshold 254, then the transition detection model 120 determines that a transition is occurring and produces an output 256a. An indication of whether a transition is occurring or not can be included in the output 256a. The transition detection model 120 can use can use the outputs, 234, 238a, and/or 238b in generating the output 256a.

The output 256a indicates that a transition has been detected. The powered exosuit 110 can use the transition detection to change a behavior of the powered exosuit 110 to, for example, better assist the wearer 102 and/or to prevent injury to the wearer 102. For example, if the exosuit 110 is currently running a control program for sitting and the transition detection model 120 indicates that the wearer 102 is transitioning to a standing activity, the exosuit 110 can switch to a control program for a sitting to standing transition. The control program can, for example, provide additional assistance as the wearer 102 attempts to stand up or can lock a joint of the exosuit 110.

The output 256a can be provided to, for example, the activity detection model 230. The output 256a can be a strong indicator that the wearer 102 is not performing one of the monitored activities, e.g., that an indeterminate output such as the output 238b should be found. For example, the output 256a can be used by the exosuit 110 to increase the activity threshold 236. The activity detection model 230 can use the output 256a in determining an activity being performed by the wearer 102, and/or confidence scores for activities that the wearer 102 might be performing.

If determined confidence score found in the output 252 does not meet the threshold 254, then the transition detection model 120 determines that no transition is occurring and produces an output 256b. The output 256b indicates that no transition is occurring. The output 256b can be a strong indicator that the wearer 102 is performing an activity. For example, the output 256b can be used by the exosuit 110 to decrease the activity threshold 236.

The output 256b indicates that a transition has not been detected. The powered exosuit 110 can use the absence of transition detection to change a behavior of the powered exosuit 110 and/or to maintain a behavior of the exosuit 110 to, for example, better assist the wearer 102 and/or to prevent injury to the wearer 102. For example, if the transition detection model 120 produces the output 256b, the exosuit 110 can activate one or more safety rules meant to safeguard the wearer 102 such as, for example, increasing assistive force output, providing improved stability, reducing the allowable rotation at a joint, locking a joint to prevent rotation, or the like.

The output 256b can be provided to, for example, the activity detection model 230. The activity detection model 230 can use the output 256b in determining an activity being performed by the wearer 102, and/or confidence scores for activities that the wearer 102 might be performing.

If a transition is detected and/or determined, e.g., if output 256a is produced by the transition detection model 120, the transition detection model 120 can initiate one or more actions 258a-258e. The actions 258a-258e can be carried out by the transition detection model 120 and/or the microprocessor 224. A first action 258a is changing of thresholds to take an action. For example, as is explained in more detail below, one or more of the actions 258a-258e can have a corresponding threshold or a corresponding threshold range. If the action 258a is taken, the threshold or threshold corresponding to one or more of the actions 258a-258e can be changed. For example, transitioning from walking to climbing stairs can be considered a higher risk transition. Accordingly, if the determined transitioning is transitioning from walking to climbing stairs, the transition detection model 120 can enlarge a threshold range corresponding to activating safety rules of a third action 258c. As another example, transitions in general can be considered high risk. Accordingly, if a transition is determined to be occurring (e.g., threshold 254 is met), a first set of safety rules can be activated. If there is a higher confidence that transition is occurring (e.g., a second threshold of 80% is met), then a second set of stricter safety rules can be activated.

A second action 258b provides for the transition detection model 120 or microprocessor 224 changing the allowable force. This can include changing the amount of force that a force sensor detects before power assistance is provided by the actuator(s) 208. Additionally or alternatively, this can include changing the amount of force or torque applied by the actuator(s) 208. The allowable force, and/or the force or torque applied by the actuator(s) 208 can depend on the confidence score of a transition occurring, a type of transition detected as occurring, and/or the confidence score of a type of transition detected as occurring.

The third action 258c provides for the transition detection model 120 or microprocessor 224 activating one or more safety rules. The actual safety rules can be used, for example, to improve stability provided by the powered exosuit 110, to increase the amount of assistance provided by the powered exosuit 110 (e.g., by activating the actuator(s) 208 or increasing the force output of the actuator(s) 208), to decrease the amount of assistance provided by the powered exosuit 110 (e.g., by deactivating the actuator(s) 208 or decreasing the force output of the actuator(s) 208), to lock a hinge of the exosuit 110, and/or to unlock a hinge of the exosuit 110. The one or more safety rules activated can depend on the confidence score of a transition occurring, a type of transition detected as occurring, and/or the confidence score of a type of transition detected as occurring.

The fourth action 258d provides for the transition detection model 120 or microprocessor 224 adjusting a speed or set of permitted actions. The speed or permitted action adjustment can be used, for example, to limit the speed that the exosuit 110 allows the wearer 102 to walk or run, to increase the speed that the exosuit 110 allows the wearer 102 to walk or run, to decrease the maximum allowed flex at a hinge of the powered exosuit 110, to increase the maximum allowed flex at a hinge of the powered exosuit 110, or the like. The speed or permitted action adjustment made can depend on the confidence score of a transition occurring, a type of transition detected as occurring, and/or the confidence score of a type of transition detected as occurring.

The fifth action 258e provides for the transition detection model 120 or microprocessor 224 selecting or changing a control program. There can be, for example, a control program for when a transition is detected. As another example, there can be a control program for each type of transition such that when a type of transition is detected (e.g., transitioning from sitting to standing) and the action is 258e is performed, a control program specific to the type of transition detected is activated. Activating a control program for a transition can result in deactivating a previous running control program, such as a control program for a particular activity. The control program selected can depend on the confidence score of a transition occurring, a type of transition detected as occurring, and/or the confidence score of a type of transition detected as occurring.

The one or more actions of the actions 258a-258e performed can depend on the confidence score corresponding to a transition occurring. That is, one or more of the actions 258a-258e can have a corresponding threshold or a corresponding threshold range, such that an action of the actions 258a-258e will only be performed if the determined confidence score meets a corresponding threshold of that action.

In some implementations, instead of comparing the output 252 to a single threshold, the transition detection model 120 compares the output 252 to multiple thresholds and/or threshold ranges. Each of these thresholds and/or threshold ranges can correspond to a single discrete option. For example, there can be a corresponding threshold or threshold range for each of the actions 258a-258e.

As an example, the first action 258a and the second action 258b can have a threshold range from 50% to 79%, the third action 258c and the fifth action 258e can have a threshold of 80%, and the fourth action 258d can have a threshold range of 70% to 79%. Accordingly, based on the output 152, the exosuit 110 (e.g., the microprocessor 224) would perform the third action 258c and the fifth action 258e, but would refrain from performing the actions 258a, 258b, and 258d.

In some implementations, instead of comparing the output 252 to a single threshold, the transition detection model 120 uses the output 252 in one or more algorithms, e.g., as an input variable. For example, there may be an algorithm corresponding to the each of the actions 258a-258e.

As an example, there can be an algorithm corresponding to the second action 258b that uses the output 252 as input. The algorithm can use the percentage (e.g., 80%) in the output 252 to calculate how to throttle the one or more actuators 208.

The exosuit 110 can also include a data store. The data store can be used to, for example, store the sensor data 232 and/or previously collected sensor data. The activity detection model 230 and/or the transition detection model 120 can access the data store to retrieve sensor data, such as past sensor data. The past sensor data can be used to train the activity detection model 230 and/or the transition detection model 120. The activity detection model 230 can use past sensor data to determine one or more activities that wearer 102 was previously performing, such as the most recent activity that wearer 102 was previously performing. The transition detection model 120 can use past sensor data to determine one or more previous activity transitions, such as the last detected activity transition. The data store can be used to, for example, store past outputs and determinations, e.g., of the activity detection model 230, the transition detection model 120, and/or the microprocessor 224. For example, the data store can be used to store the last activity that the wearer 102 was determined to be performing, the last two activities that the wearer 102 was determined to be performing, or the last three activities that the wearer 102 was determined to be performing. The activity detection model 230 can use this past activity data in generating the output 234. For example, the activity detection model 230 can eliminate or decrease the confidence scores for activities that are unlikely to follow the last activity that the wearer 102 was determined to be performing.

In some implementations, the transition detection model 120 can detect a transition without input from the activity detection model 230. For example, the transition detection model 120 can use only the senor data 232 to determine if a transition is occurring. The sensor data 232 can indicate a deviation corresponding to a transition.

In some implementations, the exosuit 110 does not include the activity detection model 230. For example, the transition detection model 120 can use only the senor data 232 to determine if a transition is occurring. The sensor data 232 can indicate a deviation corresponding to a transition.

Figure 3:
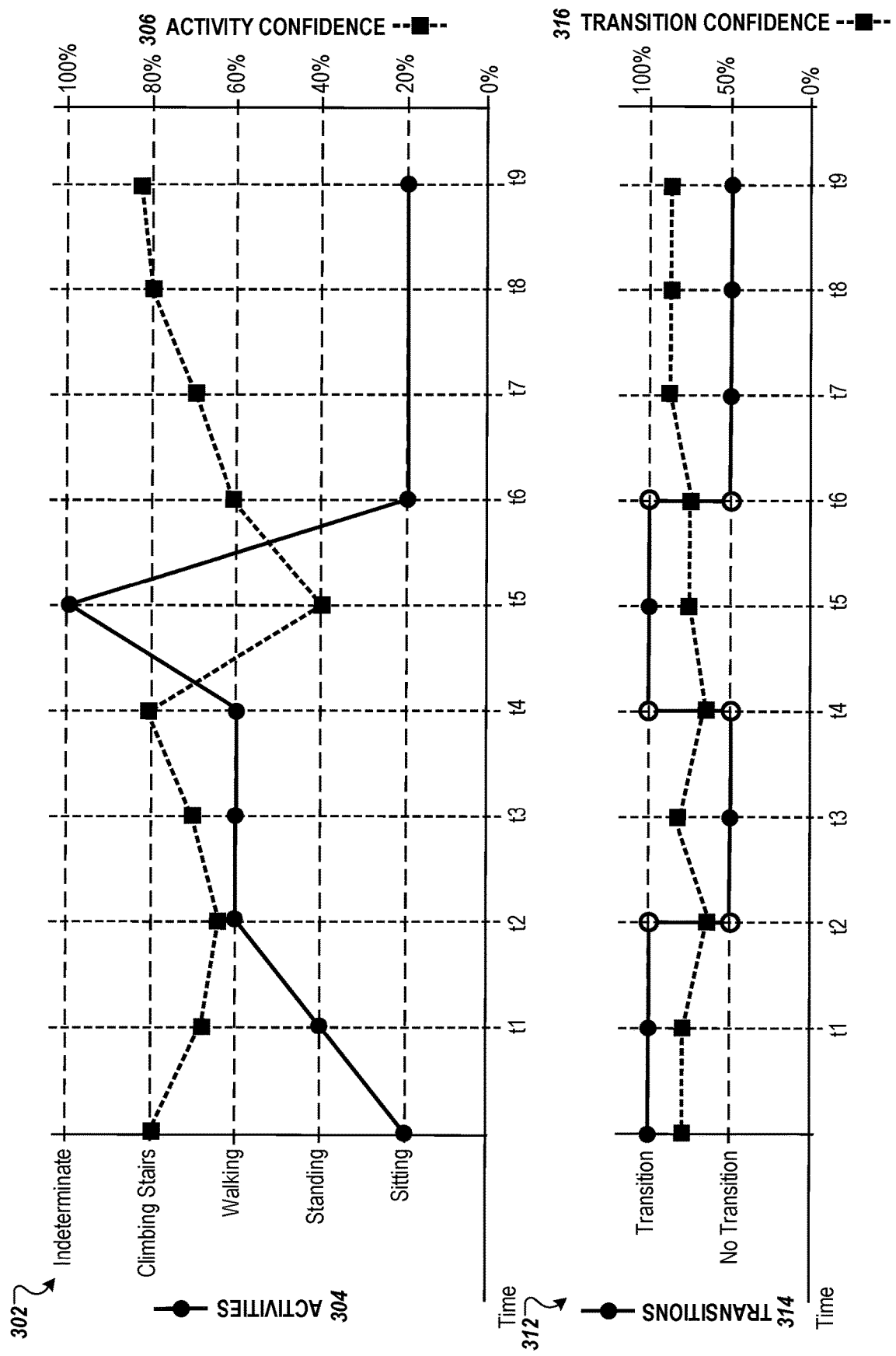
FIG. 3 provides charts illustrating example outputs of an activity transition control structure of a powered exosuit.

FIG. 3 are charts 302 and 312 illustrating example outputs of an activity transition control structure of a powered exosuit. As an example, the first chart 302 presents the output of the activity detection model 230, and the second chart 312 presents the output of the transition detection model 120. The sensor data 232 can indicate a deviation corresponding to a transition.

The activity detection model 230 can output scores or confidence levels indicating the confidence the model has in its prediction of activities. The microprocessor 224 can, for example, use these scores or confidence levels to determine a classification of activity that the wearer 102 is performing. Alternatively, the activity detection model 230 itself can output a classification of activity that the wearer 102 is performing. The chart 302 presents these scores/confidences and classifications over time.

Specifically, the chart 302 depicts activity classifications 304 represented as a solid line graph with circles. The circles represent specific data points, e.g., actual activity classification determinations made by the activity detection model 230 or made using output of the activity detection model 230. The chart 302 also depicts activity confidence scores 306 represented as a dashed line with squares. The squares represent specific data points, e.g., the actual confidence scores outputted by the activity detection model 230.

The chart 302 can also present the relationships between activity classifications. The chart 302 can indicate, for example, those activities that are most likely to proceed a given activity. As an example, a sitting activity is typically followed by a standing activity, a standing activity is typically followed by a walking activity or a sitting activity, a walking activity is typically followed by a climbing stairs activity or a standing activity, and a climbing stairs activity is typically followed by a walking activity. The relationships between activity classifications, such as those activities that are most likely to proceed a given activity, can be determined by the microprocessor 224 or the activity detection model 230 based on, for example, stored historical data.

The transition detection model 230 can output a score or confidence of a transition occurring. The microprocessor 224 can, for example, use this score or classification to determine if the wearer 102 is transitioning between activities. Alternatively, the transition detection model 120 itself can output a determination of whether the wearer 102 is transition between activities, e.g., a binary output. The chart 312 presents these scores/confidences and transition determinations over time.

Specifically, the chart 312 depicts transition detections 314 represented as a solid line graph with circles. The circles represent specific data points, e.g., actual transition detections made by the transition detection model 120 or made using output of the transition detection model 120. The chart 312 also depicts transition confidence scores 316 represented as a dashed line with squares. The squares represent specific data points, e.g., the actual confidence scores outputted by the transition detection model 120, which indicate different levels of confidence that the model has in its transition predictions at the corresponding time steps.

As provided in the charts 302 and 312, when an activity is being performed by the wearer 102 for a measurable amount of time, no transition is occurring. Accordingly, during this time, no transition is detected. Similarly, a detection of a transition coincides with a change in the activity that the wearer 102 is performing.

As shown, the occurrence of a transition as provided in the chart 312 (and also indicated in the chart 302 as a change in activity) can coincide with a loss in confidence in the activity that the wearer 102 is performing as provided in the chart 302. As an example, between t4 and t6, the activity detection model 230 might be unable to determine what activity is currently being performed and/or confused as to what activity is currently being performed, as indicated by the activity being labeled as indeterminate at t5 and the low activity confidence between t4 and t6. The activity detection model 230 can receive and use the output from the transition detection model 120 to determine that a transition is occurring. The activity detection model 230 can then refer to, for example, historical data to determine what activity or activities generally follow the last determined activity, e.g., walking. The activity detection model 230 can determine, for example, that based on a transition occurring, and/or the output of one or more sensors, that activity that the wearer 102 is in the process of performing will not be walking and/or will be sitting.

Similarly, multiple transitions happening in row as provided in the chart 312 (and also indicated in the chart 302 as a back to back changes in the activities being performed) can coincide with a loss in confidence in the activity that is performed as provided in the chart 302.

A number of implementations have been described. Nevertheless, it will be understood that various modifications may be made without departing from the spirit and scope of the disclosure. For example, various forms of the flows shown above may be used, with steps re-ordered, added, or removed.

A module (also known as a program, software, software application, script, or code) may be written in any form of programming language, including compiled or interpreted languages, and it may be deployed in any form, including as a stand-alone program or as a module, component, subroutine, or other unit suitable for use in a computing environment. A module does not necessarily correspond to a file in a file system. A module may be stored in a portion of a file that holds other programs or data (e.g., one or more scripts stored in a markup language document), in a single file dedicated to the program in question, or in multiple coordinated files (e.g., files that store one or more modules, sub programs, or portions of code). A module may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a module include, by way of example, both general and special purpose microprocessors, and one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computing devices, the method comprising:
 classifying, by the one or more computing devices, a first activity of a wearer of a powered exosuit as a first type of activity, wherein the activity of the wearer is classified based on output generated by an activity detection model, the output generated by the activity detection model including a first set of activity confidence scores that include a confidence score for each of a plurality of types of activities;

based on the classification of the first activity of the wearer as the first type of activity, selecting, by the one or more computing devices, a first control program for the first type of activity from a plurality of control programs that are respectively designated for controlling the powered exosuit during different types of activities;

controlling, by the one or more computing devices, the powered exosuit using the first control program for the first type of activity and a set of control parameters; and while controlling the powered exosuit using the first control program for the first type of activity:
receiving, by the one or more computing devices, sensor data for the powered exosuit;
obtaining, by the one or more computing devices, a second set of activity confidence scores generated by the activity detection model based on the received sensor data, wherein the second set of activity confidence scores do not satisfy a threshold needed to indicate a subsequent type of activity of the wearer;
without determining the subsequent type of activity of the wearer, detecting, by the one or more computing devices, that a transition of the wearer out of the first type of activity is likely, wherein the transition is detected to be likely based on output generated by a transition detection model based on the sensor data, the output generated by the transition detection model including a transition confidence score that indicates a likelihood that a change in activity is occurring without specifying the subsequent type of activity of the wearer;
in response to detecting the transition of the wearer out of the first type of activity based on the output transition confidence score of the transition detection model:
altering, by the one or more computing devices, the set of control parameters used with the first control program to control the powered exosuit; and
before the one or more computers determine the subsequent type of activity, controlling, by the one or more computing devices, the powered exosuit for a period of time using the first control program and the altered set of control parameters determined based on the output of the transition detection model.

2. The method of claim 1, wherein the powered exosuit is a soft robotic exosuit configured to assist lower extremity mobility of the wearer of the powered exosuit.

3. The method of claim 1, wherein the powered exosuit is arranged as actuated clothing, such that the powered exosuit is attached to or embedded within a garment.

4. The method of claim 1, wherein the sensor data indicates at least one of:
parameters of the powered exosuit;
physiological parameters for the wearer; or
indications of interactions of the wearer with the powered exosuit.

5. The method of claim 1, wherein the sensor data comprises sensor data provided by one or more sensors of the powered exosuit, wherein the one or more sensors comprise at least one of:

a position sensor;
a motion sensor;
an accelerometer;
an inertial measurement unit;
a potentiometer;
an electrogoniometer;
a pose detection sensor;
a joint angle sensor;
an encoder;
a load sensor;
a pressure sensor;
a force sensor;
a torque sensor;
a strain gauge;
a piezoresistive sensor;
a gyroscope;
an electromyographic (EMG) sensor;
an electroencephalography (EEG) sensor; or
an electrooculography sensor.

6. The method of claim 1, wherein the transition detection model includes a machine learning model trained to classify whether sensor data is indicative of a transition between different types of activities of the wearer.

7. The method of claim 1, wherein detecting the transition comprises performing a classification using a classifier that comprises a neural network, a support vector machine, a classifier, a regression model, a reinforcement learning model, a clustering model, a decision tree, a random forest model, a genetic algorithm, a Bayesian model, a Gaussian mixture model, a statistical model, or a rule-based model.

8. The method of claim 1, wherein altering the set of control parameters used with the first control program comprises at least one of:
initiating a movement of the powered exosuit;
altering or discontinuing a movement in progress by the powered exosuit;
changing an amount of force allowed to be exerted by the powered exosuit;
changing a speed of movement allowed for the powered exosuit;
changing a set of actions allowed to be performed by the powered exosuit;
changing a set of rules applied for controlling the powered exosuit; or
changing a threshold or range used for controlling the powered exosuit.

9. The method of claim 1, wherein altering the set of control parameters used with the first control program comprises at least one of:
decreasing or removing an application of force by the powered exosuit;
decreasing an amount of force allowed to be exerted by the powered exosuit;
decreasing a speed of movement allowed for the powered exosuit;
reducing a set of actions allowed to be performed by the powered exosuit;
activating one or more safety rules for controlling the powered exosuit;
increasing a confidence level threshold required to initiate an action by the powered exosuit; or
reducing or shifting a range boundary for an operating parameter of the powered exosuit to limit a degree of force or movement caused by the powered exosuit.

10. The method of claim 1, wherein the transition detection model is configured to predict an occurrence of a transition without providing output predicting an activity of the wearer.

11. The method of claim 1, wherein the transition detection model is configured to predict whether a transition is occurring directly from feature data derived from the sensor data, without receiving input indicating activities or predicted activities of the wearer.

12. The method of claim 1, wherein detecting the transition of the wearer out of the first type of activity comprises determining that the transition confidence score satisfies a transition detection threshold.

13. The method of claim 1, wherein the transition detection model is a machine learning model that has been trained, based on examples of transitions between different types of activities, to distinguish sensor data patterns representing transitions between different types of activities from sensor data patterns that do not represent transitions between different types of activities.

14. The method of claim 13, wherein the activity detection model is a machine learning model that has been trained, based on examples of different types of activities of wearers of powered exosuits, to distinguish sensor data patterns representing the first type of activity from sensor data patterns representing the second type of activity.

15. The method of claim 1, wherein classifying the first activity of the wearer of the powered exosuit as the first type of activity comprises determining that a confidence score for the first type of activity output by the activity detection model satisfies an activity classification threshold.

16. The method of claim 15, wherein detecting that the transition of the wearer out of the first type of activity is likely further comprises determining that, in the second set of activity confidence scores, the activity confidence score for the first type of activity does not satisfy the activity classification threshold.

17. The method of claim 1, further comprising, after controlling the powered exosuit for the period of time using the first control program and the altered set of control parameters:
classifying, by the one or more computing devices, a second activity of the wearer of the powered exosuit as a second type of activity based on output generated by the activity detection model; and
based on the classification of the second activity of the wearer as the second type of activity:
selecting, by the one or more computing devices, a second control program for the second type of activity from the plurality of control programs; and
switching to control the powered exosuit using the second control program;
wherein the period of time during which the powered exosuit is controlled using the first control program and the altered set of control parameters comprises a time period during which a confidence score for the second type of activity output by the activity detection model does not satisfy an activity confidence threshold.

18. The method of claim 17, wherein the period of time during which the powered exosuit is controlled using the first control program and the altered set of control parameters comprises a time period during which:
a confidence score for the first type of activity output by the activity detection model does not satisfy the activity confidence threshold; and
a confidence score for the second type of activity output by the activity detection model does not satisfy the activity confidence threshold.

19. A system comprising:
one or more computing devices; and
one or more computer-readable media storing instructions that, when executed by the one or more computing devices, cause the one or more computing devices to perform operations comprising:
classifying, by the one or more computing devices, a first activity of a wearer of a powered exosuit as a first type of activity, wherein the activity of the wearer is classified based on output generated by an activity detection model, the output generated by the activity detection model including a first set of activity confidence scores that include a confidence score for each of a plurality of types of activities;
based on the classification of the first activity of the wearer as the first type of activity, selecting, by the one or more computing devices, a first control program for the first type of activity from a plurality of control programs that are respectively designated for controlling the powered exosuit during different types of activities;
controlling, by the one or more computing devices, the powered exosuit using the first control program for the first type of activity and a set of control parameters; and
while controlling the powered exosuit using the first control program for the first type of activity:
receiving, by the one or more computing devices, sensor data for the powered exosuit;
obtaining, by the one or more computing devices, a second set of activity confidence scores generated by the activity detection model based on the received sensor data, wherein the second set of activity confidence scores do not satisfy a threshold needed to indicate a subsequent type of activity of the wearer;
without determining the subsequent type of activity of the wearer, detecting, by the one or more computing devices, that a transition of the wearer out of the first type of activity is likely, wherein the transition is detected to be likely based on output generated by a transition detection model based on the sensor data, the output generated by the transition detection model including a transition confidence score that indicates a likelihood that a change in activity is occurring without specifying the subsequent type of activity of the wearer;
in response to detecting the transition of the wearer out of the first type of activity based on the transition confidence score of the transition detection model;
altering, by the one or more computing devices, the set of control parameters used with the first control program to control the powered exosuit; and
before the one or more computers determine the subsequent type of activity, controlling, by the one or more computing devices, the powered exosuit for a period of time using the first control program and the altered set of control parameters determined based on the output of the transition detection model.

20. One or more non-transitory computer-readable media storing instructions that, when executed by one or more computing devices, cause the one or more computing devices to perform operations comprising:
- classifying, by the one or more computing devices, a first activity of a wearer of a powered exosuit as a first type of activity, wherein the activity of the wearer is classified based on output generated by an activity detection model, the output generated by the activity detection model including a first set of activity confidence scores that include a confidence score for each of a plurality of types of activities;
- based on the classification of the first activity of the wearer as the first type of activity, selecting, by the one or more computing devices, a first control program for the first type of activity from a plurality of control programs that are respectively designated for controlling the powered exosuit during different types of activities;
- controlling, by the one or more computing devices, the powered exosuit using the first control program for the first type of activity and a set of control parameters; and
- while controlling the powered exosuit using the first control program for the first type of activity:
  - receiving, by the one or more computing devices, sensor data for the powered exosuit;
  - obtaining, by the one or more computing devices, a second set of activity confidence scores generated by the activity detection model based on the received sensor data, wherein the second set of activity confidence scores do not satisfy a threshold needed to indicate a subsequent type of activity of the wearer;
- without determining the subsequent type of activity of the wearer, detecting, by the one or more computing devices, that a transition of the wearer out of the first type of activity is likely, wherein the transition is detected to be likely based on output generated by a transition detection model based on the sensor data, the output generated by the transition detection model including a transition confidence score that indicates a likelihood that a change in activity is occurring without specifying the subsequent type of activity of the wearer; and
- in response to detecting the transition of the wearer out of the first type of activity based on the transition confidence score of the transition detection model;
- altering, by the one or more computing devices, the set of control parameters used with the first control program to control the powered exosuit; and
  - before the one or more computers determine the subsequent type of activity, controlling, by the one or more computing devices, the powered exosuit for a period of time using the first control program and the altered set of control parameters determined based on the output of the transition detection model.

* * * * *